No. 844,054. PATENTED FEB. 12, 1907.
A. R. SWOPE.
INDICATOR FOR MEDICINE BOTTLES.
APPLICATION FILED FEB. 13, 1906.
FIG. I.
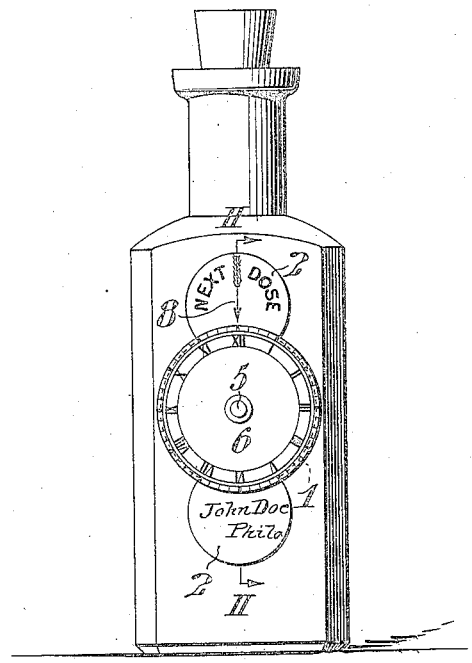
FIG. II.
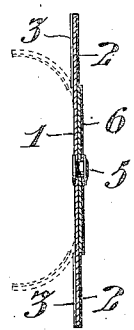
WITNESSES:
Clifton C. Hallowell
John C. Bergner
INVENTOR:
ALFRED R. SWOPE,
by Paige, Paul & Foley
Attys.

UNITED STATES PATENT OFFICE.

ALFRED R. SWOPE, OF PHILADELPHIA, PENNSYLVANIA.

INDICATOR FOR MEDICINE-BOTTLES.

No. 844,054.   Specification of Letters Patent.   Patented Feb. 12, 1907.

Application filed February 13, 1906. Serial No. 300,874.

*To all whom it may concern:*

Be it known that I, ALFRED R. SWOPE, of Philadelphia, in the county of Philadelphia and State of Pennsylvania, have invented certain new and useful Improvements in Indicators for Medicine-Bottles, whereof the following is a specification, reference being had to the accompanying drawings.

It is the object of my invention to provide a device which is distinct from but which may be readily attached to a medicine-bottle to indicate the time when the next dose of medicine should be taken, and, as hereinafter described, the device comprises a base of flexible material provided with means for attaching it to the surface of the bottle and having a pivotal support for a rotary dial provided with numbers or other indications of divisions of time which may be selectively presented in registry with an index-point on said base.

My invention comprises the various novel features of construction and arrangement hereinafter more definitely specified and claimed.

In the drawings, Figure I is an elevation of a bottle provided with an indicator conveniently embodying my invention. Fig. II is a sectional view of said indicator, taken on the line II II in Fig. I.

In said figures, the indicator-base comprises the central body portion 1, provided with flexible extensions or flaps 2 2, which are provided with means for attaching said base to the bottle—conveniently a coating of adhesive compound 3. It may be observed that said base being flexible may be attached either to a plane surface, as indicated in Fig. I, or may be bent to conform to a curved surface, as indicated in dotted lines in Fig. II. Said base 1 is provided with the pivotal connection 5 for the dial 6, which is provided with numbers "I" to "XII," inclusive, indicating hours, and is also provided with graduations at its edge indicating fractions of an hour. It is to be understood that said dial 6 may be rotated upon its pivotal connection 5, so that any desired indication of an hour or fraction of an hour may be presented in registry with the index 8, which is in stationary relation with the base 1 and conveniently upon one of the flaps 2.

Although I have shown a solid pivotal connection between the base 1 and the rotary dial 6, it is to be understood that an ordinary tubular eyelet or other pivotal connecting means may be employed.

As indicated in Fig. I, the upper flap 2 is imprinted with the words "Next dose" and with the figure of an arrow, serving as the index. However, it is to be understood that said base or the flaps thereof may be otherwise imprinted—for instance, with the name and address of a druggist or proprietor of the medicine inclosed by the bottle. Moreover, although I find it convenient to manufacture both the base and the dial of the indicator of flexible cardboard it is to be understood that any suitable material may be employed—for instance, sheet-celluloid.

I do not desire to limit myself to the precise details of construction and arrangement herein described, as it is obvious that various modifications may be made therein within the scope of the claims without departing from the essential features of my invention.

I claim—

1. A time-indicator for medicine-bottles, comprising a rotary dial provided with indications of time; a base of flexible material, having a central body portion and distinct independently-flexible flaps extending therefrom; one of said flaps having thereon a stationary index; a coating of adhesive material on each of said flaps; and, a pivotal connection between said dial and said base, supporting said dial upon the face of said base opposite to that having said adhesive coating, substantially as set forth.

2. A time-indicator for medicine-bottles comprising a rotary dial provided with indications of time; a base of flexible material, having a central body portion and distinct independently-flexible flaps extending therefrom; one of said flaps having thereon directions for the user and a stationary index; a coating of adhesive material on each of said flaps; and, a pivotal connection between said dial and said base supporting said dial upon the face of said base opposite to that having said adhesive coating, substantially as set forth.

3. A time-indicator for medicine-bottles, comprising a rotary dial provided with indications of time; an imperforate base of flexible material, having a central body portion and distinct independently-flexible flaps extending therefrom; one of said flaps having thereon a stationary index; a coating of adhesive material on each of said flaps; and, a pivotal connection between said dial and said base, supporting said dial upon the face of said base opposite to that having adhesive coating, substantially as set forth.

4. A time-indicator for medicine-bottles, comprising a rotary dial provided with indications of time; a base having a central body portion covered by said dial; distinct independent flexible flaps in unitary relation with said base, extending laterally beyond said dial, and having thereon means arranged to inform the user of the identity of the party issuing said indicator, substantially as set forth.

5. A time-indicator for medicine-bottles, comprising a rotary dial provided with indications of time; a base having a central body portion covered by said dial; distinct independent flexible flaps in unitary relation with said base extending laterally beyond said dial; one of said flaps having thereon means arranged to inform the user of the identity of the party issuing said indicator, and the other of said flaps having thereon directions for the user, substantially as set forth.

In testimony whereof I have hereunto signed my name, at Philadelphia, in the State of Pennsylvania, this 12th day of February, 1906.

ALFRED R. SWOPE.

Witnesses:
ARTHUR E. PAIGE,
ANNA F. GETZFREAD.